(12) United States Patent
Barnes

(10) Patent No.: US 7,066,475 B2
(45) Date of Patent: Jun. 27, 2006

(54) SECURE CARGO TRANSPORTER

(76) Inventor: Bret E. Barnes, 214 NE. 41st Ave., Ocala, FL (US) 34470

( * ) Notice: Subject to any disclaimer, the term of this patent is extended or adjusted under 35 U.S.C. 154(b) by 309 days.

(21) Appl. No.: 10/714,360

(22) Filed: Nov. 17, 2003

(65) Prior Publication Data

US 2005/0104308 A1 May 19, 2005

(51) Int. Cl.
*B62B 1/26* (2006.01)
(52) U.S. Cl. .................. 280/35; 280/652; 280/47.28
(58) Field of Classification Search ............... 280/35, 280/638, 651, 652, 654, 655, 47.19, 47.24, 280/47.27, 47.28, 79.3
See application file for complete search history.

(56) References Cited

U.S. PATENT DOCUMENTS

| | | | | |
|---|---|---|---|---|
| 2,380,415 A * | 7/1945 | Carruthers | ................. | 414/429 |
| 3,204,975 A * | 9/1965 | Mccarthy | .................... | 280/35 |
| 5,120,183 A * | 6/1992 | Phillips | .................... | 414/490 |
| 5,348,325 A * | 9/1994 | Abrams | ...................... | 280/40 |
| 6,109,644 A * | 8/2000 | Cox | .......................... | 280/652 |
| 6,113,129 A * | 9/2000 | Marques et al. | ............ | 280/654 |
| 6,135,466 A * | 10/2000 | Irwin | ..................... | 280/47.28 |
| 6,474,930 B1* | 11/2002 | Simpson | ................... | 414/490 |
| 6,540,242 B1* | 4/2003 | Raichlen | ................. | 280/47.27 |
| 6,685,214 B1* | 2/2004 | Gregory | .................... | 280/652 |

* cited by examiner

*Primary Examiner*—Frank Vanaman
(74) *Attorney, Agent, or Firm*—Christopher J. Whewell

(57) ABSTRACT

A wheeled device useful for transporting and storing a wide variety of cargos, including cartons, crates, boxes and the like and which finds special utility in transporting and stowing musical equipment, such as amplifiers and speakers. The instant device includes vertical and horizontal elements, and further includes support arms having a variable width by which the cargo may be grasped and firmly held in place on the device. Use of a device according to the invention causes optimization of floor space required to store items on a moveable base.

19 Claims, 17 Drawing Sheets

SECURE CARGO TRANSPORTER

TECHNICAL FIELD

This invention relates to an apparatus useful for moving heavy and awkward objects. More particularly, the invention provides a wheeled truck means, which is capable of conveniently moving electronic equipment in a secured fashion. While a device according to the invention finds particular use in the music industry, for moving large speakers, amplifiers, and other pieces of stage equipment, it is also capable of moving a wide variety of other cargos, including suitcases, baggage, crates, boxes, cartons, etc.

BACKGROUND

Various wheeled trucks, carts, dollies and other similar contrivances have been devised since the invention of the wheel. Such devices include hand trucks such as those having a flat platform portion on which a cargo item to be transported is place and to which one or more vertically disposed frame members extending upwardly from the ground are attached which provide a handle means by which a user may grasp the device and push or pull it along a flat surface.

In the case of stage show performances, such as concerts, plays, and other productions, traveling road shows typically bring their own equipment to the site of the show. A mobile road show thus requires the placement of various pieces of electronic equipment including sound mixers, light boards, amplifiers, speakers, and other equipment known in the art for enhancing the quality of the production. Typically, such equipment is contained in a tractor trailer or other freighting means and is delivered to the site of the show. The equipment must be unloaded and then set into place for the performance, and afterwards must be re-loaded into the tractor trailer or other conveyance for transportation to the next show site. Thus, it is a fairly labor intensive endeavor to repeatedly load and unload stage equipment, and personnel generally referred to as "roadies" are employed for such equipment set ups and take downs.

The prior art fails to provide any device upon which may be loaded a plurality of stage equipment devices, which may also be wheeled to a desired location at a show site and the equipment left on the device during the performance, and simply wheeled away when the show is over. The present invention provides such a device. Furthermore, a device according to the invention permits placement of a plurality of stage equipment devices as an ensemble in a desired location requiring fewer square feet of surface area for the equipment, thus optimizing space utilization. A device according to a preferred form of the invention enables appurtenant equipment such as: cords, footswitches and other effects to ride on-board during equipment transportation of musical amplification equipment from one location to another. This aspect eliminates lost equipment and reduces set-up time. In addition, cords used during performances do not have to be disconnected, which facilitates expedient and organized set-up. A device according to the invention may also act as a stand for performances, and eliminates redundant devices required to elevate amplification equipment. These and other advantages of the present invention shall become apparent to one of ordinary skill after reading and understanding this specification and the claims appended hereto.

SUMMARY OF THE INVENTION

The invention provides a device useful for transporting and securing various articles which comprises a first outer frame member having a first end portion, a second end portion, a lower length portion and an upper length portion and a second outer frame member having a first end portion, a second end portion, a lower length portion and an upper length portion. The first and second outer frame members each comprise a bend, so that their lower length portions reside in the same substantially-horizontal plane and their upper length portions reside in the same substantially-vertical plane. There is also a first supporting cross-member having a first end portion and a second end portion wherein the first end portion of the first supporting cross-member is attached to the first outer frame member at a point on its upper length portion, and wherein the second end portion of the first supporting cross-member is attached to the second outer frame member at a point on its upper length portion. The invention also provides for a second supporting cross-member having a first end portion and a second end portion wherein the first end portion of the second supporting cross-member is attached to the first outer frame member at a point on its lower length portion, and wherein the second end portion of the second supporting cross-member is attached to the second outer frame member at a point on its lower length portion. The invention also provides for a third supporting cross-member having a first end portion and a second end portion wherein the first end portion of the third supporting cross-member is attached to the first outer frame member at its first end portion, and wherein the second end portion of the third supporting cross-member is attached to the second outer frame member at its first end portion. There is provided a first inner frame member having a first end portion, a second end portion, a lower length portion and an upper length portion, and a second inner frame member having a first end portion, a second end portion, a lower length portion and an upper length portion. Each of the first and second inner frame members comprise a bend, so that their lower length portions reside in the same substantially-horizontal plane and so that their upper length portions reside in the same substantially-vertical plane, and the first and second inner frame members are attached to the third supporting cross member at a point on their upper length portions. There is provided a first vertical support member slidably disposed within the first end portion of the first inner frame member, as well as a second vertical support member slidably disposed within the first end portion of the second inner frame member. The invention provides for a first support arm attached to the upper length portion of the first outer frame member and a second support arm attached to the upper length portion of the second outer frame member. The entire construction also includes a plurality of wheels attached at a location selected from the group consisting of: the first inner frame member, second inner frame member, the first outer frame member, and the second outer frame member, to confer motion capabilities to the device as a whole by enabling it to be pulled or pushed, the weight of the device preferably resting on the wheels during its motion.

DETAILED DESCRIPTION

Figure 1:
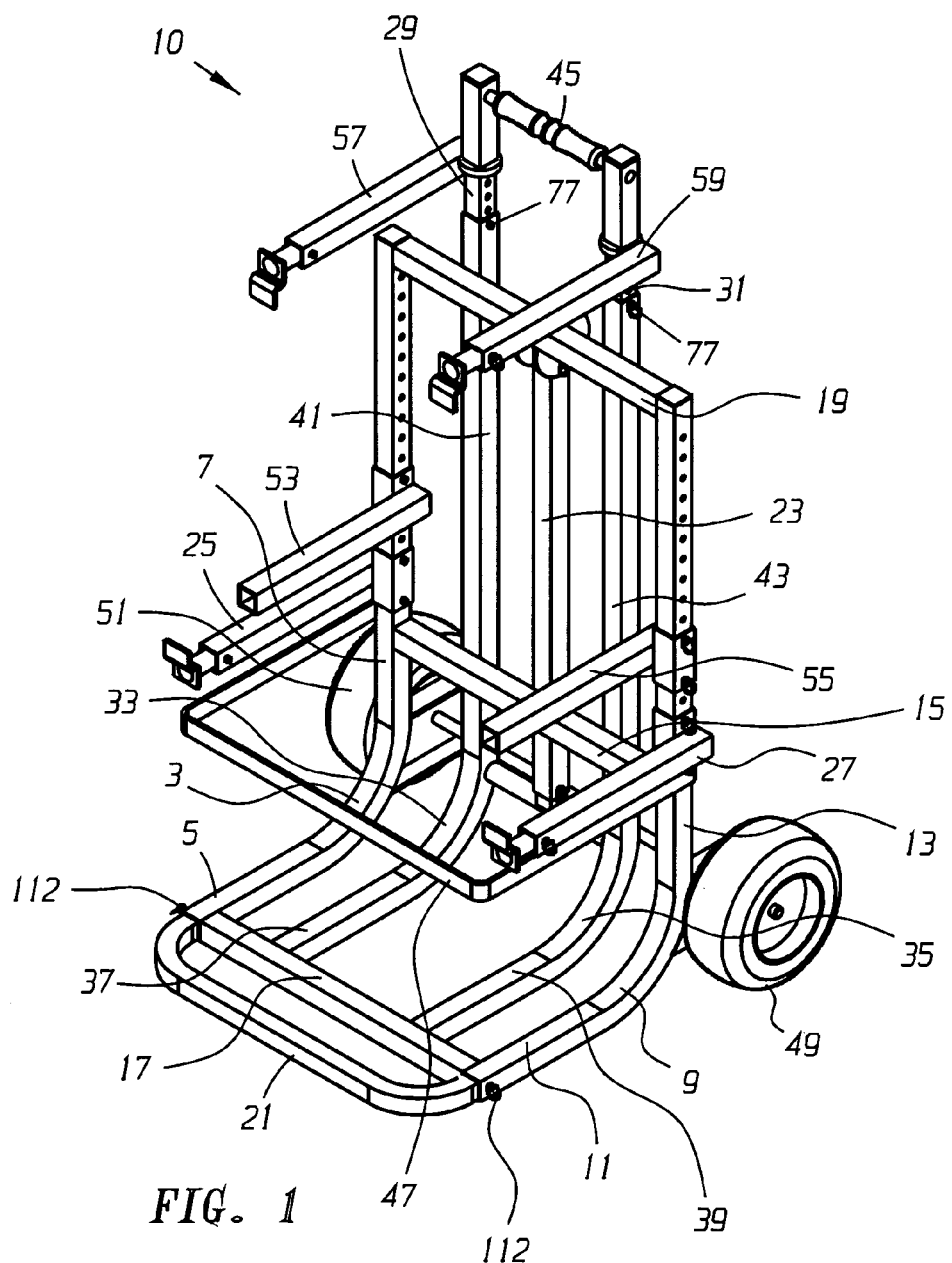
FIG. 1 shows a perspective view of a device according to one form of the invention.

Referring to the drawings and initially to FIG. 1 there is shown a perspective view of a device 10 according to one form of the invention which is useful for moving and storing a wide range of possible cargoes, including musical equipment such as amplifiers, speakers, and the like. In this figure there is a first outer frame member 3 which includes a lower length portion 5 and an upper length portion 7. There is also a second outer frame member 9 having a lower length portion 11 and an upper length portion 13. In this embodiment there is also a first supporting cross member 15 which has a first end portion and a second end portion, wherein the first end portion of the first supporting cross member 15 is attached to the first outer frame member 3 at a point on its upper length portion 7, and wherein the second end portion of the first supporting cross member 15 is attached to the second outer frame member 9 at a point on its upper length portion 13.

In this embodiment there is also a second supporting cross member 17 which has a first end portion and a second end portion, wherein the first end portion of the second supporting cross member 17 is attached to the first outer frame member 3 at a point on its lower length portion 5, and wherein the second end portion of the second supporting cross member 17 is attached to the second outer frame member 9 at a point on its lower length portion 11. In this embodiment there is also a third supporting cross member 19 which has a first end portion and a second end portion, wherein the first end portion of the third supporting cross member 19 is attached to the first outer frame member 3 at a point on its upper length portion 7 near the end portion, and wherein the second end portion of the third supporting cross member 19 is attached to the second outer frame member 9 at a point on its upper length portion 13 near its end portion.

There is also a u-shaped insert 21, which has a first end portion and a second end portion, wherein the first end portion is slidably disposed within the end of the lower length portion 5 of the first outer frame member 3 and wherein its second end portion is slidably disposed within the end of the lower length portion 11 of the second outer frame member 9. Thus, the outer frame members comprise hollow ends in one form of the invention and are adapted to receive the ends of the u-shaped insert in an arrangement which permits the u-shaped insert 21 to be slidably engaged within the ends of the outer frame members. Such a provision enables adjustment of the horizontal portion of a device according to the invention. The outer frame members 3 and 9 in one form of the invention are tubular, and include holes along their lengths which may be locked in place with lock pins 112 disposed through the end portions of the first 3 and second 9 outer frame members.

According to a preferred form of the invention, there is a first inner frame member 33 having a lower length portion 37 and an upper length portion 41, and a second inner frame member 35 having a lower length portion 39 and an upper length portion 43. The first inner frame member 33 has an end on its lower length portion 37 which is attached in a preferred form of the invention to the second supporting cross member 17, and the upper length portion 41 of the first inner frame members connected to either or both of the first supporting cross member 15 or third supporting cross member 19, by means such as welding, screws, or conventional fasteners including bolts, brackets, rivets, or other fastening means known in the art. According to a preferred form of the invention, the various elements of that device 10 are comprised of tubular stock, such as round or square tubing, which is preferably metallic, such as steel tubing or aluminum tubing. However, any material known to be useful for constructing hand trucks in general is suitable for use in constructing a device according to the invention. It is most preferred that a device according to the invention is constructed of tubular steel having a square cross section; however, materials of construction having other cross sections are within the scope of the present invention, including rectangular cross sections, oval cross sections, and circular cross sections.

There is a swingable handle means 23 which has a first end portion and a second end portion, whose first end portion is pivotally attached in one form of the invention to the third supporting cross member 19 at a point between the first 33 and second 35 inner frame members. In another form of the invention, the first end portion of the swingable handle means 23 is pivotally connected to a linear brace (not pictured) having a first end portion and a second end portion, wherein the first end portion of the linear brace is attached to the first inner frame member 33 at a point on its upper length portion 41 and wherein the second end portion of the linear brace is attached to the second inner frame member 35 at a point on its upper length portion 43.

In a preferred form of the invention, there is also provided a first vertical support member 29 slidably disposed in the end portion of the first inner frame member 33 that is disposed at the end of its upper length portion 41, as well as a second vertical support member 31 slidably disposed in the end portion of the second inner frame member 35 that is disposed at the end of its upper length portion 43. Thus, the first vertical support member 29 and second vertical support member 31 are able to move in and out of the first inner frame member 33 and second inner frame member 35 respectively, and are held in a desired position by means of pins 77 which pass through aligned holes disposed through the walls of a given inner frame member and vertical support member. There is a connective brace 45 which has a first end portion and a second end portion, whose first end portion is attached to the first vertical support member and whose second end portion is attached to the second vertical support member and is thus able to function as a handle means for pushing and pulling the device as a whole on its wheels.

There are a pair of wheels 49 and 51 which are preferably disposed at the ends of a common axle (FIG. 5), and the axle is attached to either the outer frame members or the inner frame members, or both, so as to render the device as a whole ready to be moved across a flat surface such as a floor by pulling back on the connective brace 45 such that the u-shaped insert 21 is caused to be raised up and away from the flat surface, and applying a pushing or a pulling force to the device as a whole, which is known in the art for wheeled trucks.

One embodiment of the invention provides a shroud support frame 47 which is generally u-shaped in configuration and which has a first end portion that is attached to the first outer frame member 3 at a point along its upper length portion 7, and a second end portion that is attached to the second outer frame member 9 at a point along its upper length portion 13.

A preferred form of the invention includes one or more support arms, including a first support arm 25 which is attached to the first outer frame member 3 at a point along its upper length portion 7. A preferred form of the invention also includes a second support arm 27 which is attached to the second outer frame member 9 at a point along its upper length portion 13. The attachment means used to attach the support arms to the outer frame members preferably allows for the movement of the support arms to a desired vertical position along the upper length portion of the outer frame members. This is readily accomplished by the support arms including a unshaped clamp at their end portions which connect to the outer frame members, which clamp has an inner contour which coincides substantially with the outer contour of the outer frame members. Pins may then be disposed through an aligned pair of holes, with one hole being through the clamp portion and the other hole being disposed through the wall of the outer frame member. Alternatively, the pins may be replaced by bolts which are threaded in bosses which are welded on the clamp portions.

A preferred form of the invention includes a third support arm 53 and a fourth support arm 55 attached to the first outer frame member and second outer frame member, respectively, in a similar fashion as the first and second support arms are attached, and being likewise adjustable in the vertical sense about the upper length portions of the first and second outer frame members.

A preferred form of the invention includes a fifth support arm 57 attached to the first vertical support member 29 and a sixth support arm 59 attached to the second vertical support member 31 by means of clamps disposed at the ends of the fifth and sixth support arms, either in a stationary fashion or slidably as described above for the case of the first and second support arms.

The support arms themselves are disposed so as to be substantially horizontal on the finished device as a whole, and their function is readily understood from what follows in the remaining figures. It is preferred that each of the support arms are substantially linear, and their overall lengths are adjustable by virtue of their construction which includes an outer tubular portion and a linear inner tubular portion which is slidably disposed within the outer tubular portion. In order to provide the inner portion of the support arms the capability of being rigidly fixed in a given position within the outer portion of the support arm, the inner and outer portions may be provided with a plurality of holes along their lengths. By aligning a hole on the inner portion with a hole on the outer portion and securing a pin, bolt or other obstruction commonly between two aligned holes, the length of the support arm may be caused to be rigidly fixed.

The end portion of the inner portion of the support arms are preferably equipped with a tip portion 75 (FIG. 13) which prevents the sliding of cargo placed on the device 10 in the front to rear direction.

In a preferred embodiment, the support arms are fixed in their overall length and the tip portions are attached to a rider which is disposed about an adjustment screw that is located within and whose length transverses the entire length of the support arm. The rider is thus moveable along the length of the support arm by turning the hex head end of the adjustment screw, and is prevented from lateral movement by virtue of the presence of a portion of its construct being positioned within a slot existing substantially along the entire length of the support arm. Thus, turning the adjustment screw causes the rider to move along the length of the support arm in one direction or the other, depending upon which direction the adjustment screw is turned. By such provision, the tips may be caused to graspingly contact a cargo item placed on the device 10, such that the cargo is firmly held in position on the support arms of the device.

Figure 2:
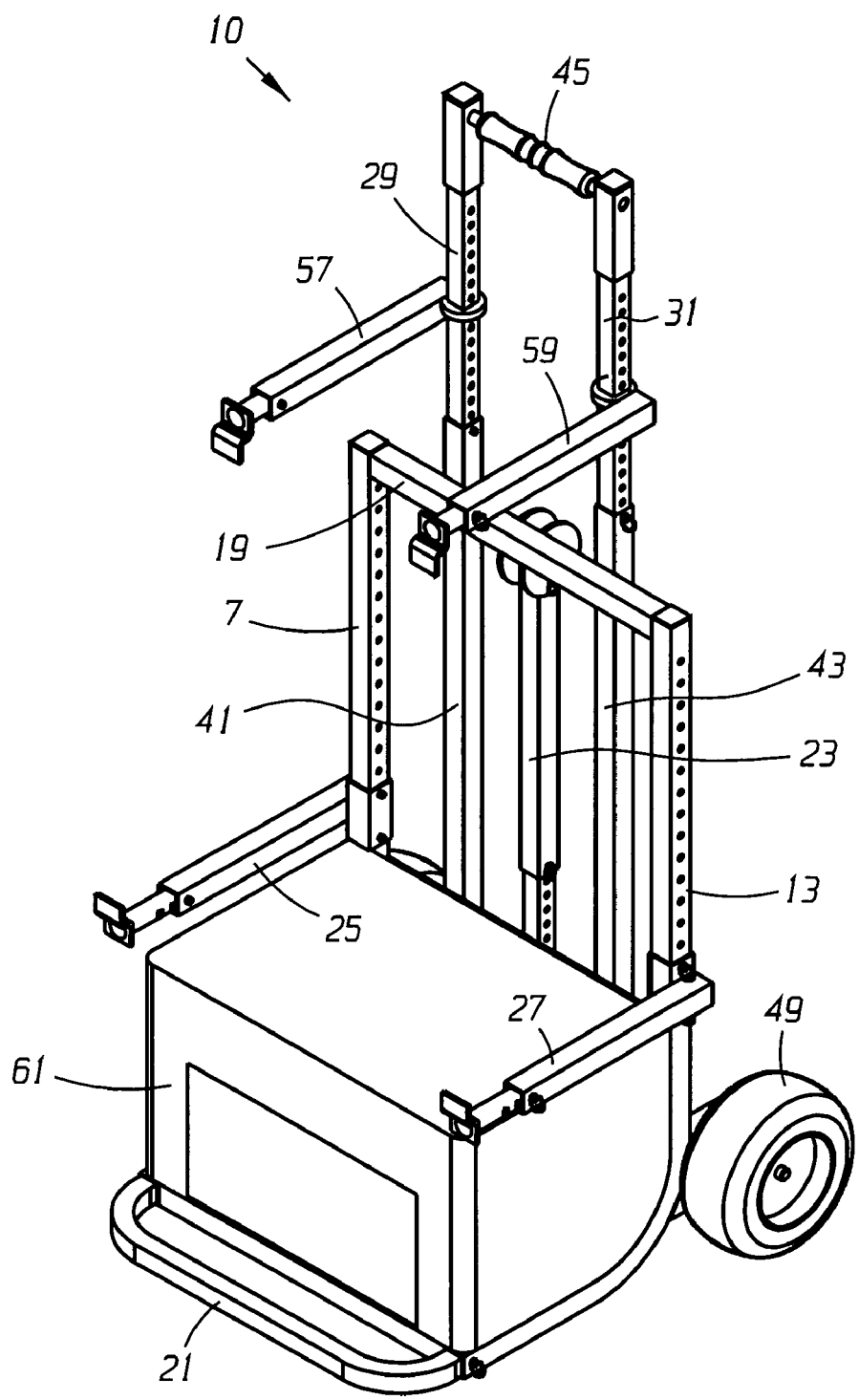
FIG. 2 shows a perspective view of a device according to a preferred form of the invention.

In FIG. 2 is shown a perspective view of a device according to an preferred form of the invention, including a shroud 61 hung from the shroud support frame 47 (FIG. 1) in similar fashion as a curtain is hung from a curtain rod. The shroud 61 is useful for containing wires, cords, and the like from falling off the device 10 during its motion and preventing tangling and/or interference with the wheels during transportation. The shroud 61 also provides for a better overall appearance of the device as a whole, and the shroud 61 may comprise a fabric or like material, such as woven nylon, cotton, plastic, linen, etc. Also shown in this figure are the upper length portions 7 and 13 of the first and second outer frame members respectively, and the upper length portions 41 and 43 of the first and second inner frame members, respectively. The third supporting cross member 19 is also shown, as well as is the swingable handle means 23 pivotally connected thereto. The first and second vertical support members 29 and 31 are shown in an extended position, including support arms 57 and 59 slidably disposed thereon, with connective brace 45 at their end portions. Also shown are the positions of the first support arm 25, second support arm 27, u-shaped insert 21, and wheel 49.

Figure 3:
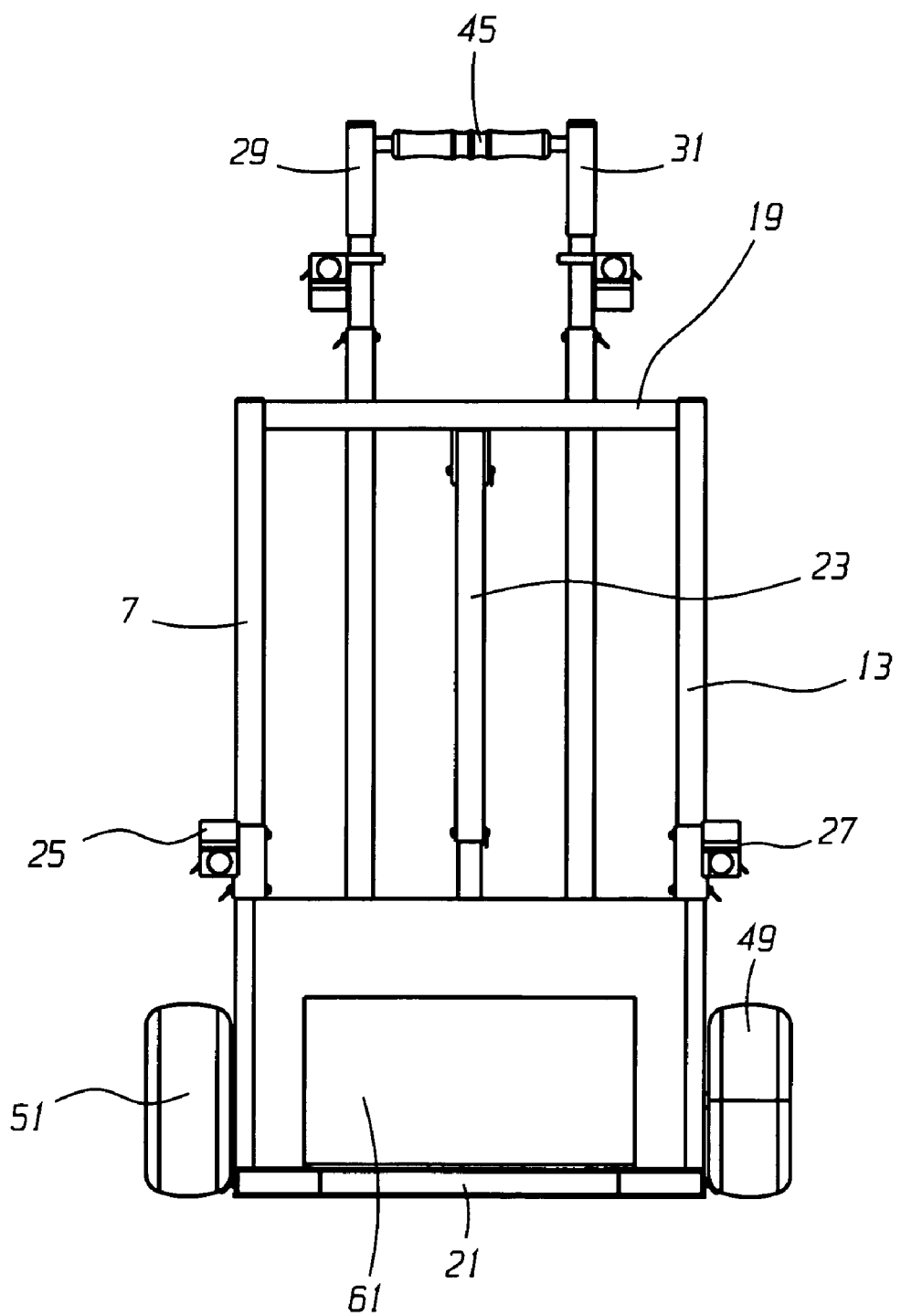
FIG. 3 shows a frontal view of a device according to one form of the invention.

In FIG. 3 is shown a frontal view of a device according to one form of the invention, detailing the respective positions of various elements of such a device including the first vertical support member 29, second vertical support member 31, connective brace 45, upper length portion 7 of first outer frame member 3, upper length portion 13 of second outer frame member 9, third supporting cross member 19, swingable handle means 23, first support arm 25, second support arm 27, wheels 49 and 51, shroud 61 and u-shaped insert 21.

Figure 4:
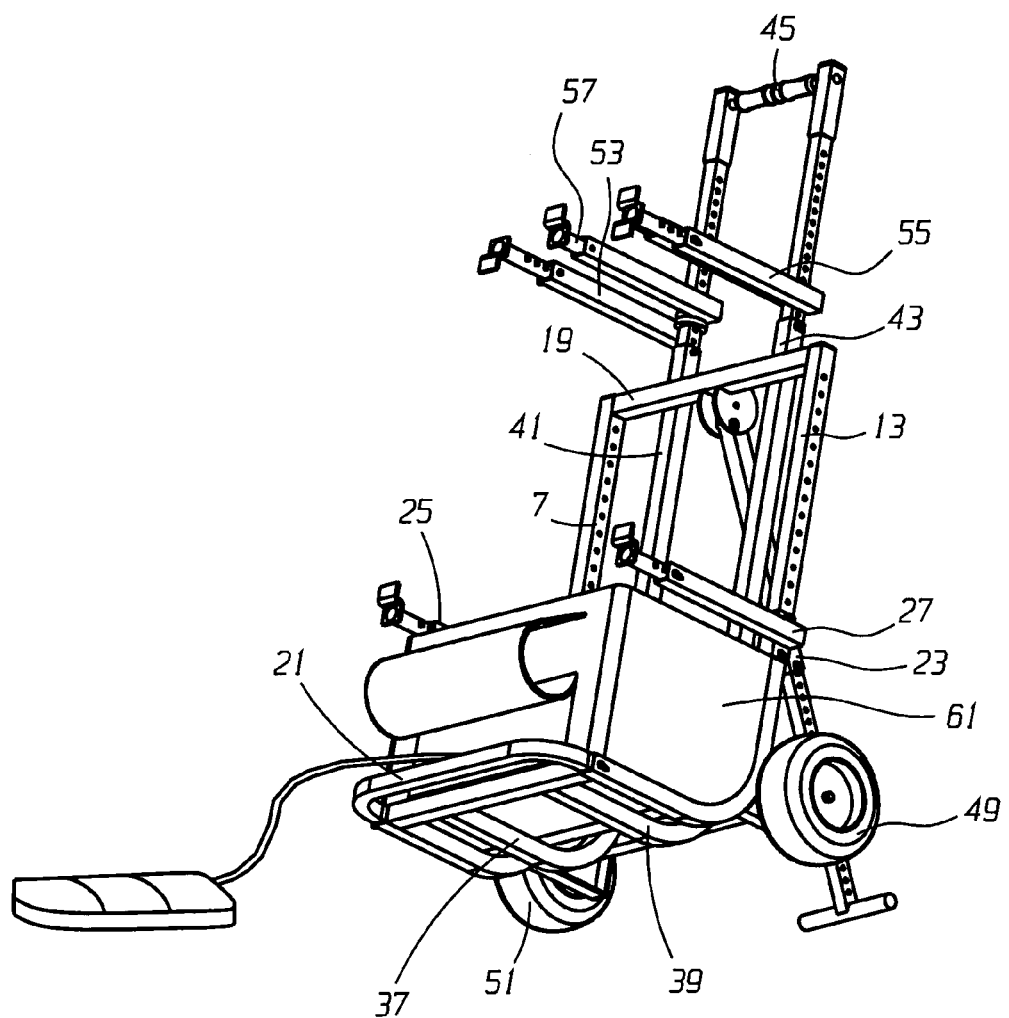
FIG. 4 shows a perspective view of a device according to one form of the invention.

In FIG. 4 is shown a perspective view of a device according to one form of the invention disposed in a tilted position, to illustrate the utility of the swingable handle means 23 in serving as a propping lever when oriented as shown to be in contact with the ground when the apparatus as a whole 10 is in a tilted position. In this figure are shown in the respective positions of the various elements which include the wheels 49 and 51, the lower length portions of the first inner frame member 37 and second inner frame member 39, u-shaped insert 21, shroud 61, first support arm 25, second support arm 27, upper length portion of the first outer frame member 7, upper length portion of the second outer frame member 13, upper length portion of the first inner frame member 41, upper length portion of the second inner frame member 43, third supporting cross member 19, support arms 53, 55, and 57, and connective brace 45.

Figure 5:
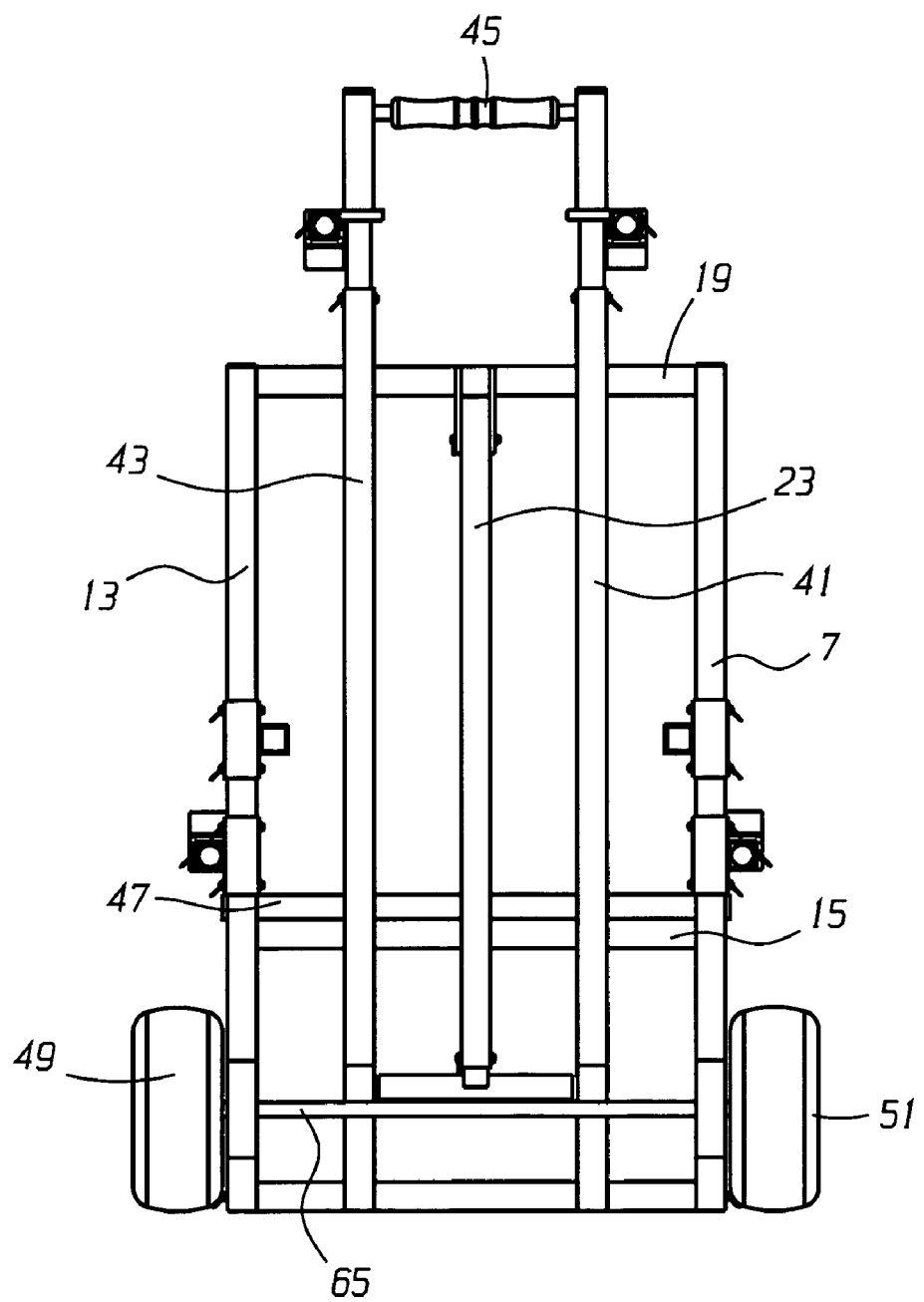
FIG. 5 shows a rear view of a device according to one form of the invention.

In FIG. 5 is shown a rear view of a device according to one form of the invention, showing the arrangement of the respective elements of the invention, including the wheels 49 and 51, axle 65, the upper length portion of the first outer frame member 7, upper length portion of the second outer frame member 13, upper length portion of the first inner frame member 41, upper length portion of the second inner frame member 43, third supporting cross member 19, the upper length portion of the first outer frame member 7, the upper length portion of the second outer frame member 13, and the connective brace 45.

Figure 6:
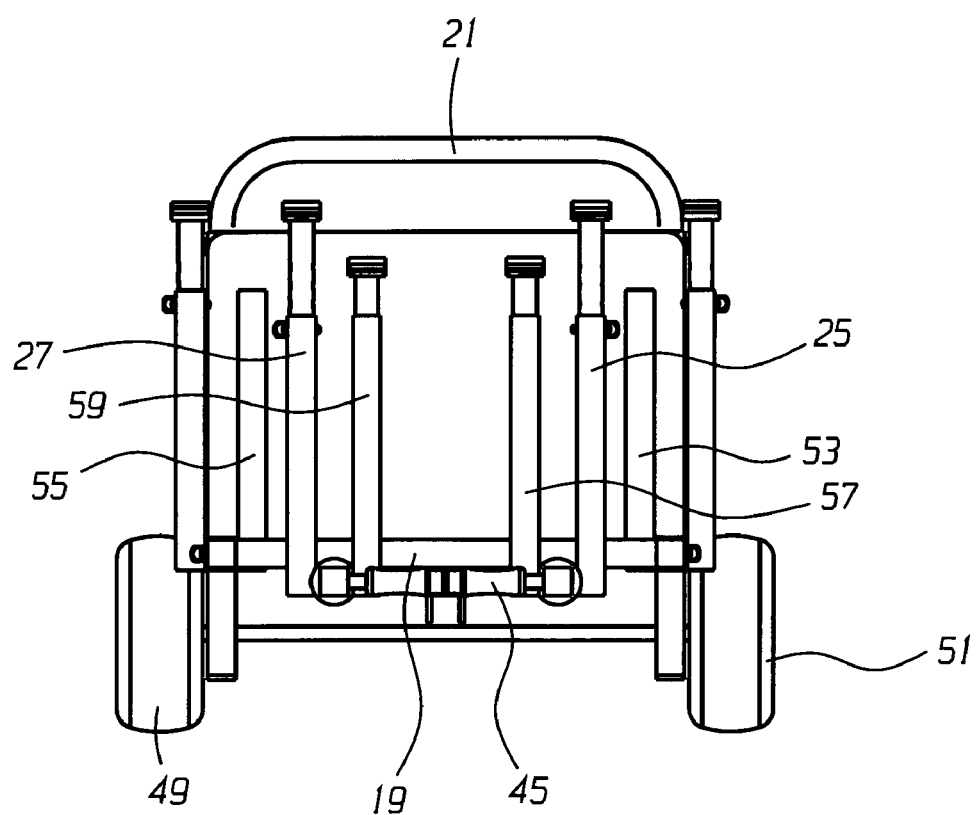
FIG. 6 shows an overhead view of a device according to one form of the invention.

In FIG. 6 is shown an overhead view of a device according to one form of the invention, including the wheels 49 and 51, connective brace 45, third supporting cross member 19, support arms 25, 27, 53, 55, 57, and 59, and the u-shaped insert 21.

Figure 7:
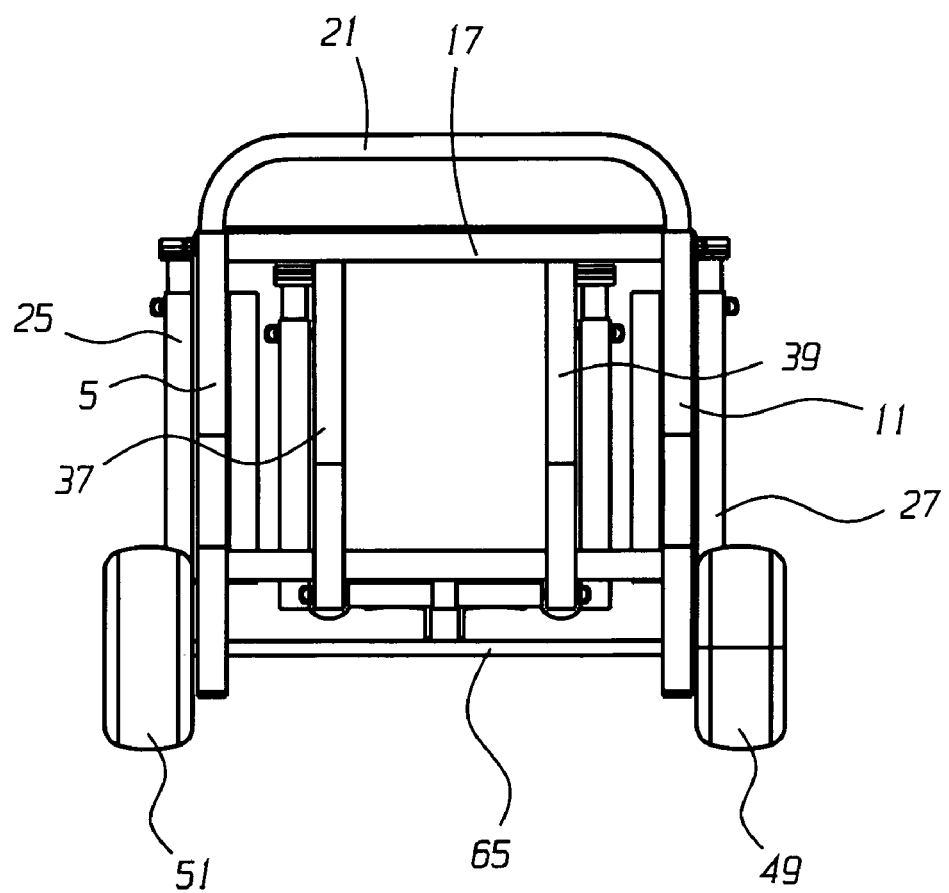
FIG. 7 shows a bottom view of a device according to one form of the invention.

In FIG. 7 is shown a bottom view of a device according to one form of the invention, including the wheels 49 and 51, axle 65, support arms 25 and 27, lower length portion of first outer frame member 5, lower length portion of second outer frame member 11, lower length of first inner frame member 37, lower length of second inner frame member 39, u-shaped insert 21, and second supporting cross member 17.

Figure 8:
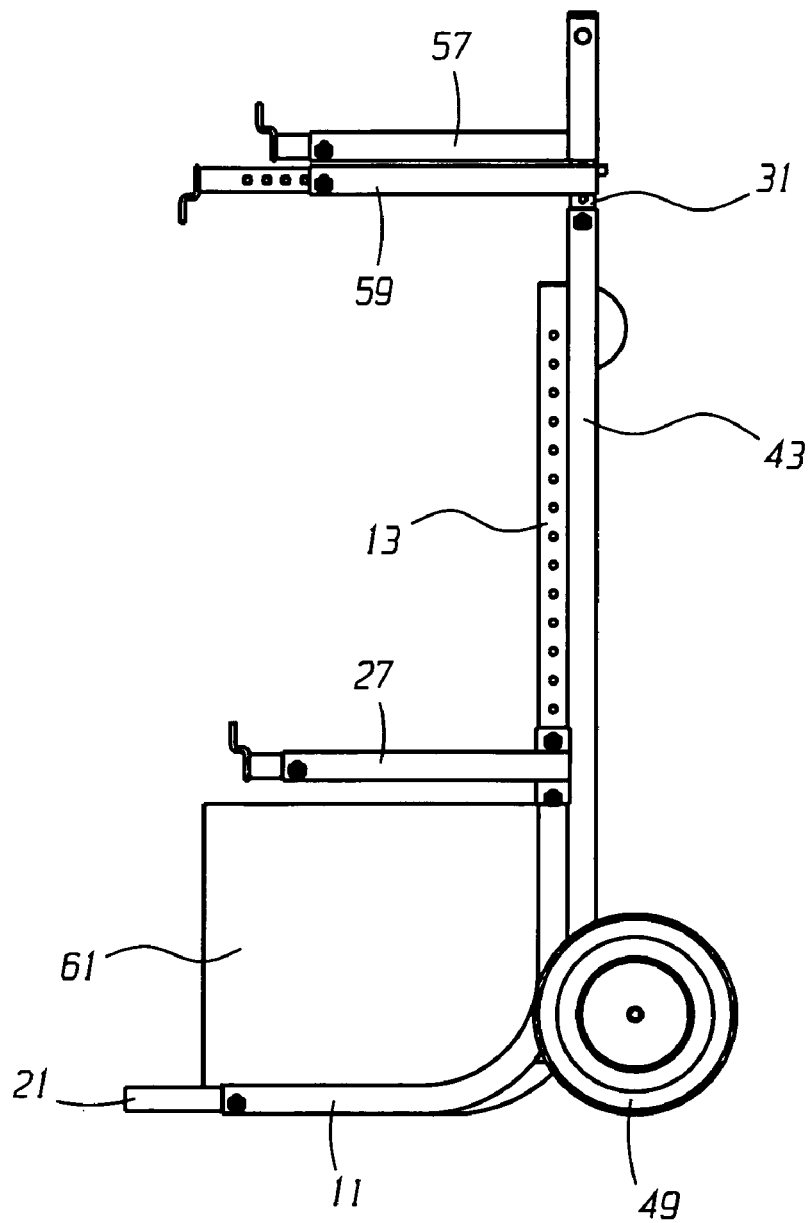
FIG. 8 shows a right side view of a device according to one form of the invention.

In FIG. 8 is shown a right side view of a device according to one form of the invention including the lower length portion of the second outer frame member 11, u-shaped insert 21, shroud 61, support arm 27, upper length portion of the second outer frame member 13, support arms 57, 59, second vertical support member 31, upper length of second inner frame member 43, and wheel 49.

Figure 9:
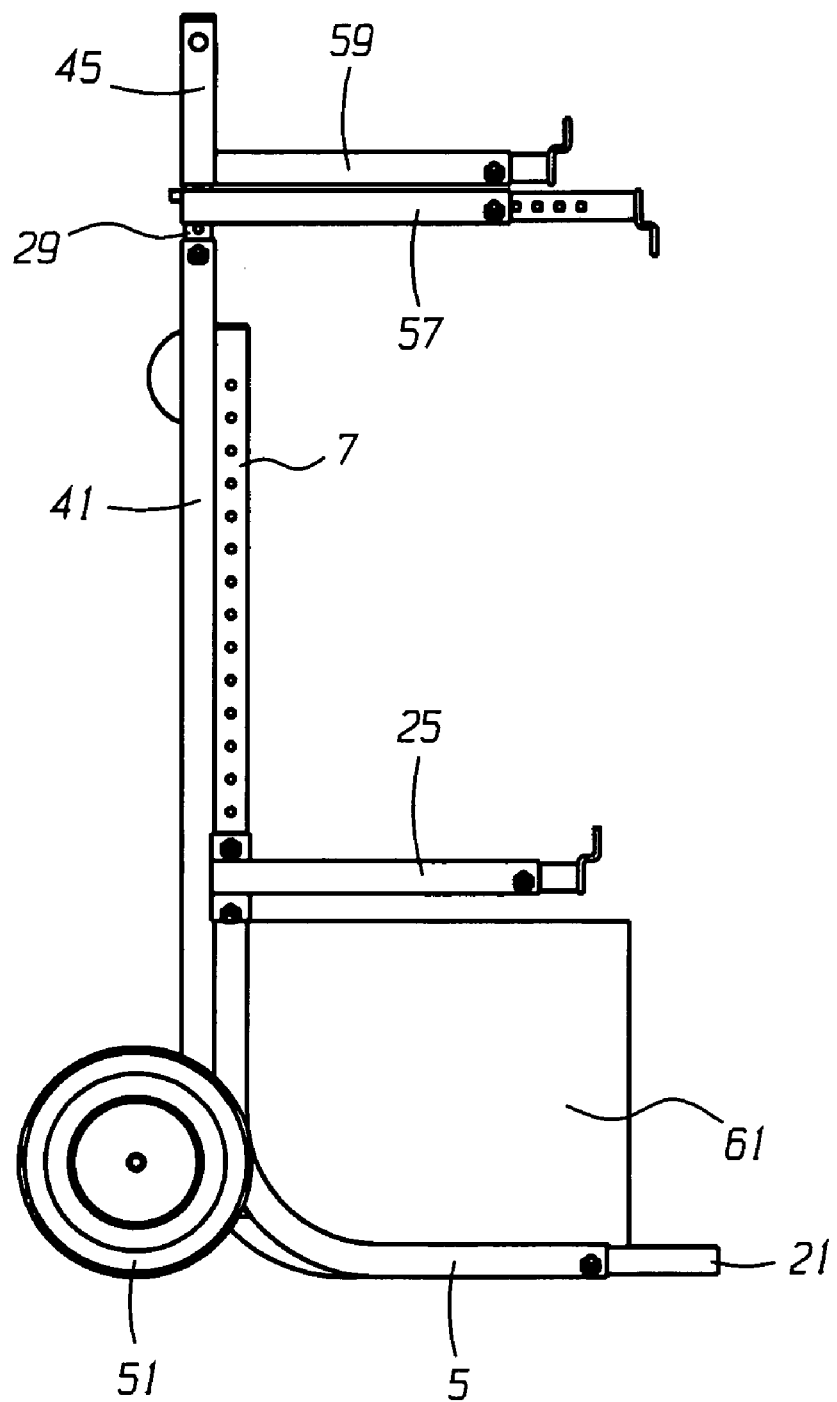
FIG. 9 shows a left side view of a device according to one form of the invention.

In FIG. 9 is shown a left side view of a device according to one form of the invention including the lower length portion of the first outer frame member 5, u-shaped insert 21, shroud 61, support arm 25, upper length portion of the first outer frame member 7, support arms 57, 59, connective brace 45, first vertical support member 29, upper length of first inner frame member 41, and wheel 51. In this figure, the swingable handle means 23 is in its stowed position.

Figure 10:
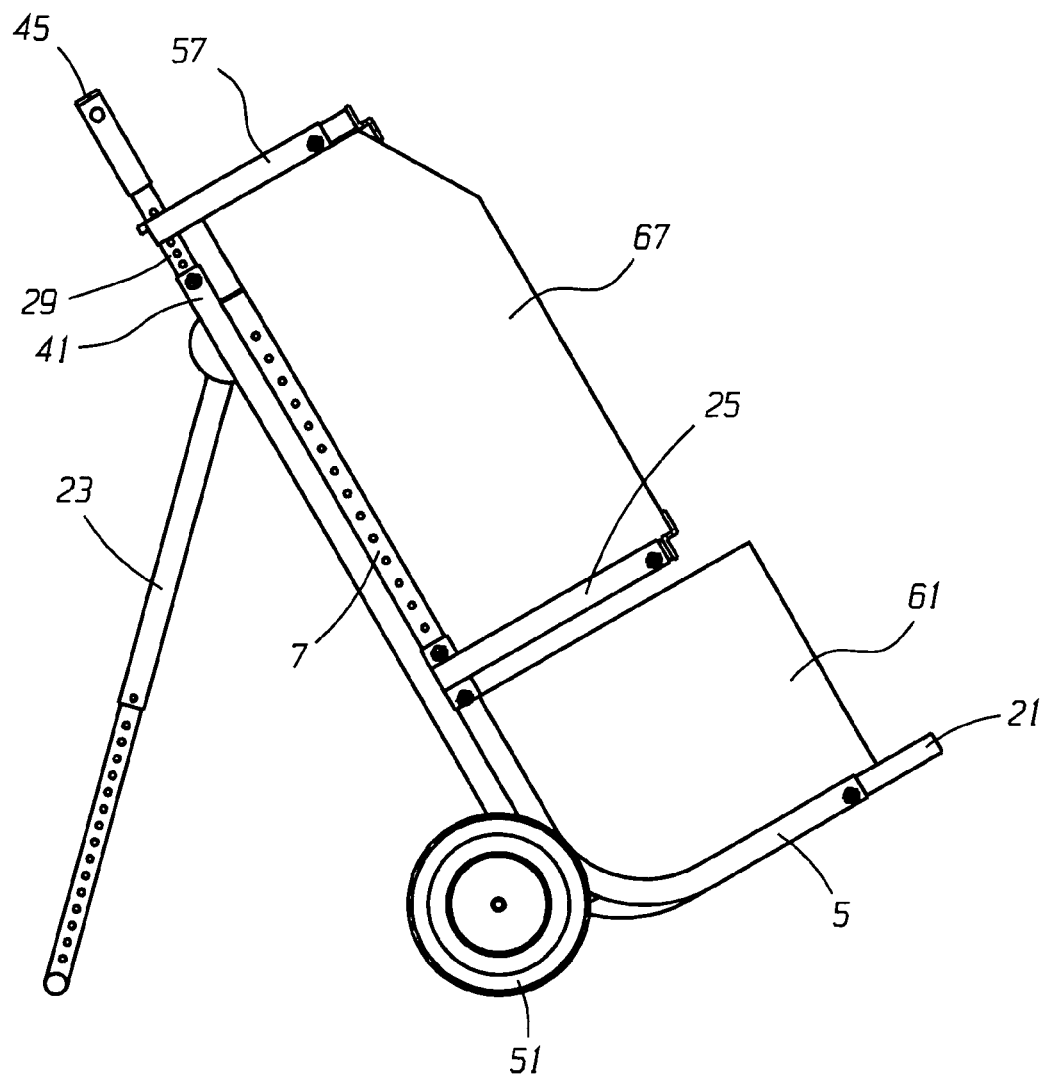
FIG. 10 shows a left side view of a device according to one form of the invention loaded with a cargo item.

In FIG. 10 is shown a left side view of a device according to one form of the invention loaded with a cargo item 67, which may be an amplifier. In this figure are also shown the lower length portion of the first outer frame member 5, unshaped insert 21, shroud 61, support arms 25 and 57, upper length portion of the first outer frame member 7, connective brace 45, first vertical support member 29, upper length of first inner frame member 41, wheel 51, and the swingable handle means 23 is in an extended position.

Figure 11:
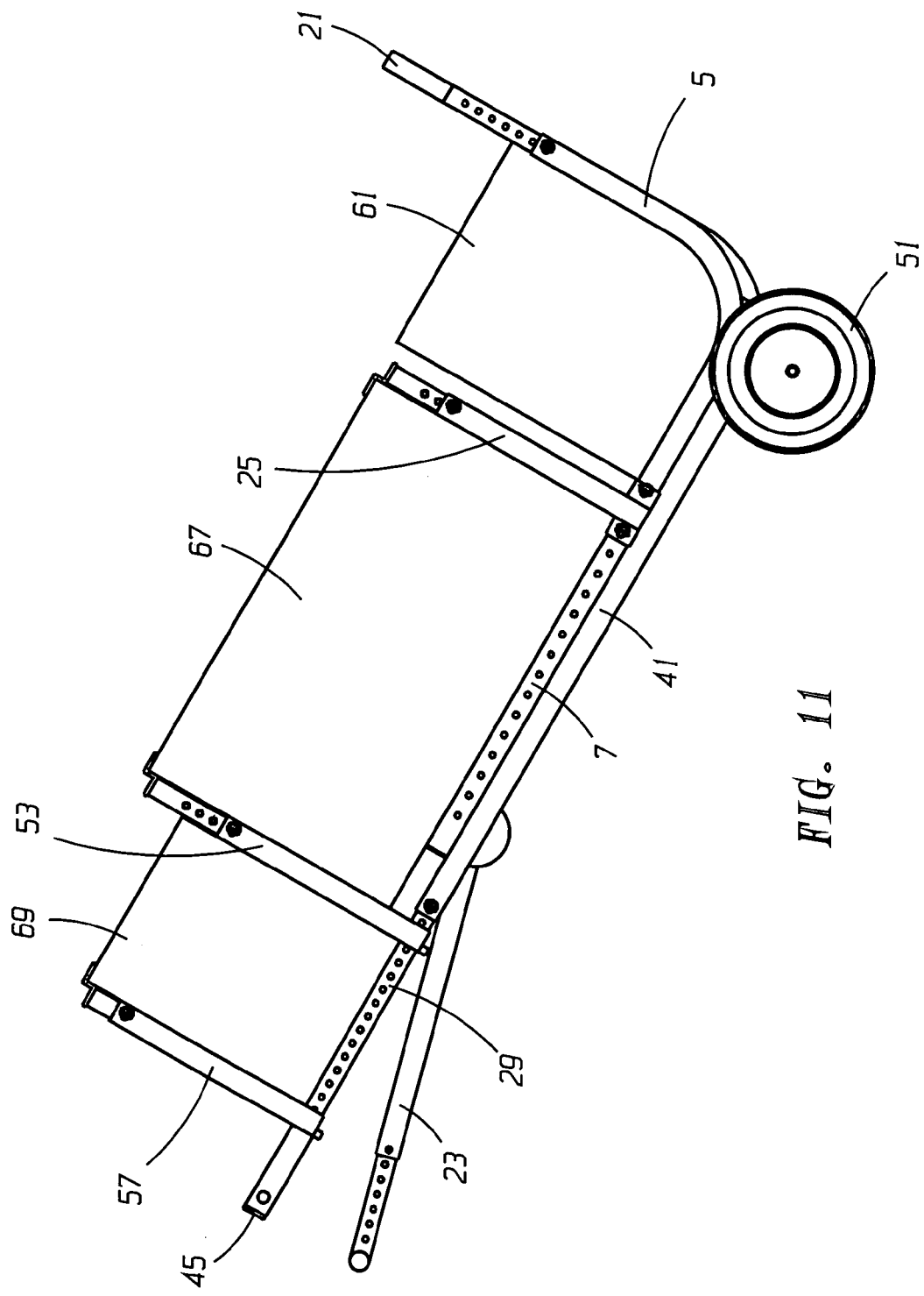
FIG. 11 shows a left side view of a device according to one form of the invention loaded with a plurality of cargo items.

In FIG. 11 is shown a left side view of a device according to one form of the invention loaded with a plurality of cargo items 67 and 69, which may be amplifiers, speakers, luggage, cartons, boxes, etc. In this figure are also shown the lower length portion of the first outer frame member 5, u-shaped insert 21, shroud 61, support arms 25, 53 and 57, upper length portion of the first outer frame member 7, connective brace 45, first vertical support member 29, upper length of first inner frame member 41, wheel 51, and the swingable handle means 23 is in an extended position.

Figure 12:
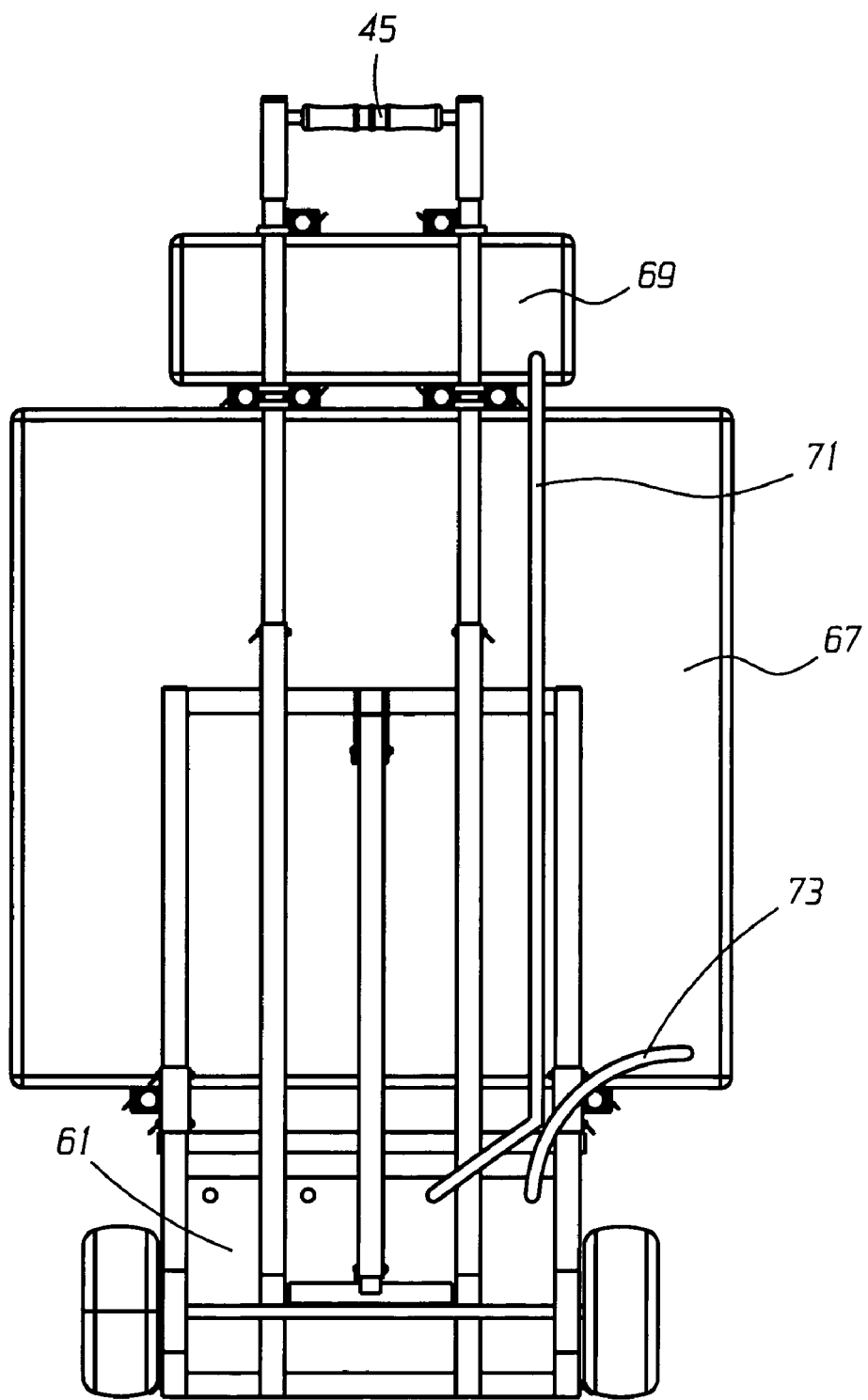
FIG. 12 shows a rear view of a device according to one form of the invention loaded with a plurality of cargo items.

In FIG. 12 is shown a rear view of a device according to one form of the invention loaded with a plurality of cargo items 67 and 69, which in this case are an amplifier and a speaker, respectively. Also shown is the routing of wires 71 and 73 from the respective devices down into the shroud portion 61 for management purposes.

Figure 13:
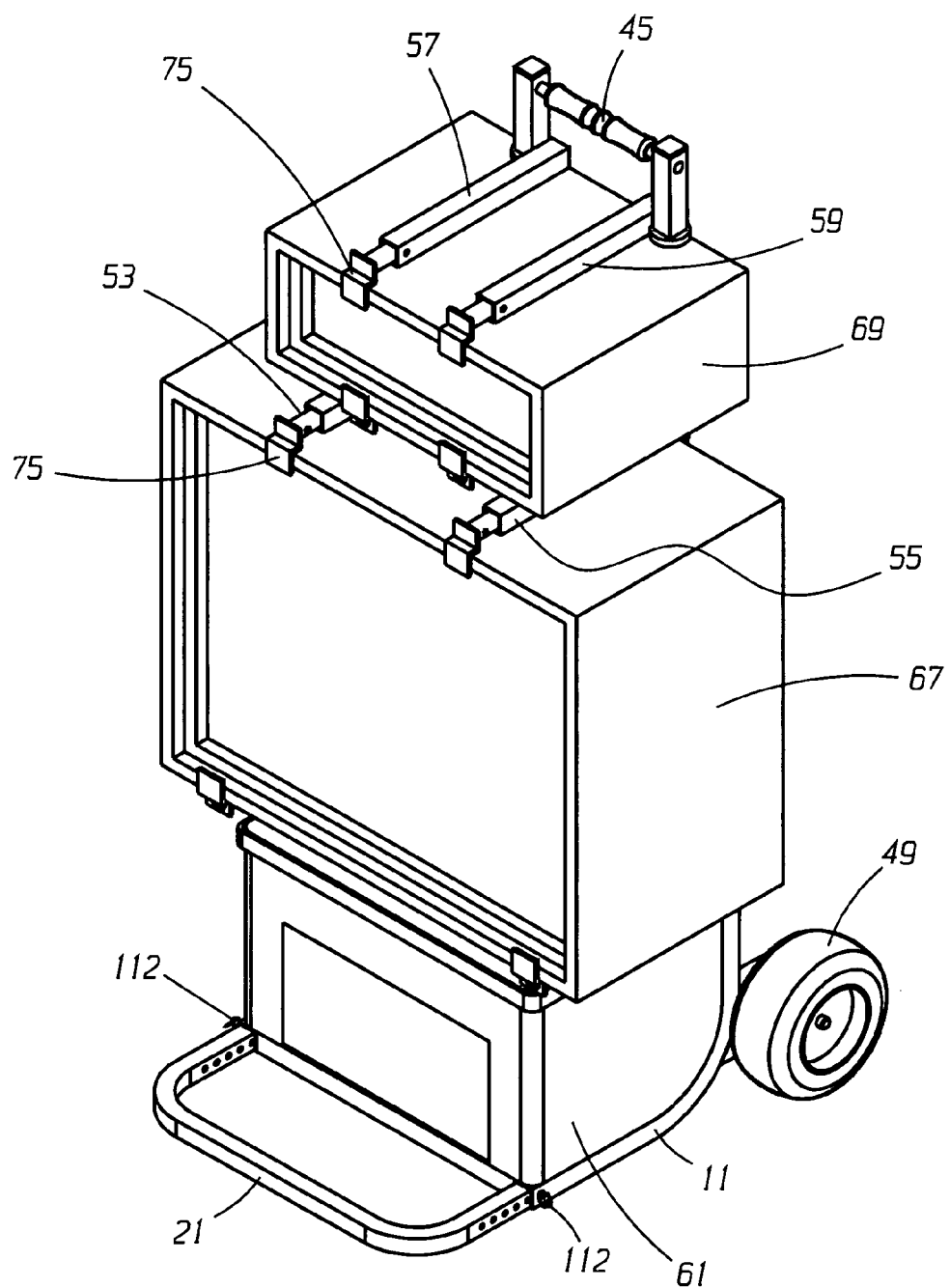
FIG. 13 shows a perspective view of a device according to one form of the invention loaded with a plurality of cargo items.

In FIG. 13 is shown a perspective view of a device according to one form of the invention loaded with a plurality of cargo items 67 and 69. Also shown in this figure are the positions of the lower length portion of the second outer frame member 11, wheel 49, shroud 61, support arms 53, 55, 57, 59, connective brace 45, tips 75, and u-shaped insert 21, which in this figure is shown in one of its possible extended positions with respect to the ends of the lower length portions of the outer frame members in which it is slidably disposed, and held in place by means of pins 112 disposed through aligned holes in these elements, as previously described.

Figure 14C:
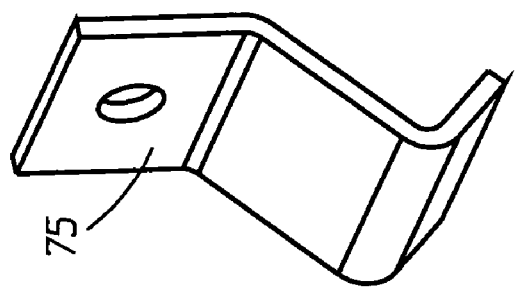
FIG. 14 shows various embodiments of tip portions for the support arms useful in various embodiments of the present invention.
Figure 14B:
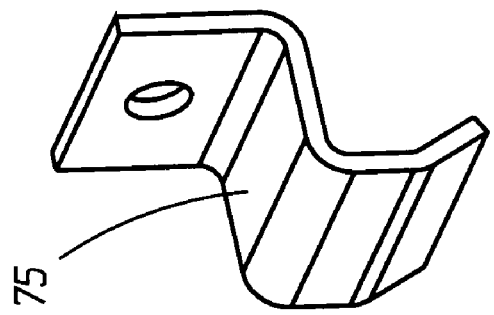
Figure 14A:
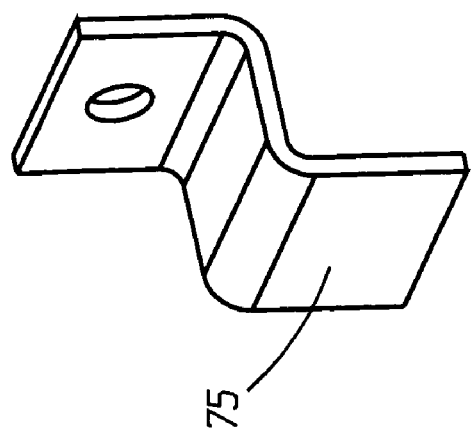

In FIG. 14 is shown various embodiments of tip portions 75 for the support arms useful in various embodiments of the present invention. Basically, these tips are contoured to readily fit and grasp the corners of a cargo item.

Figure 15A:
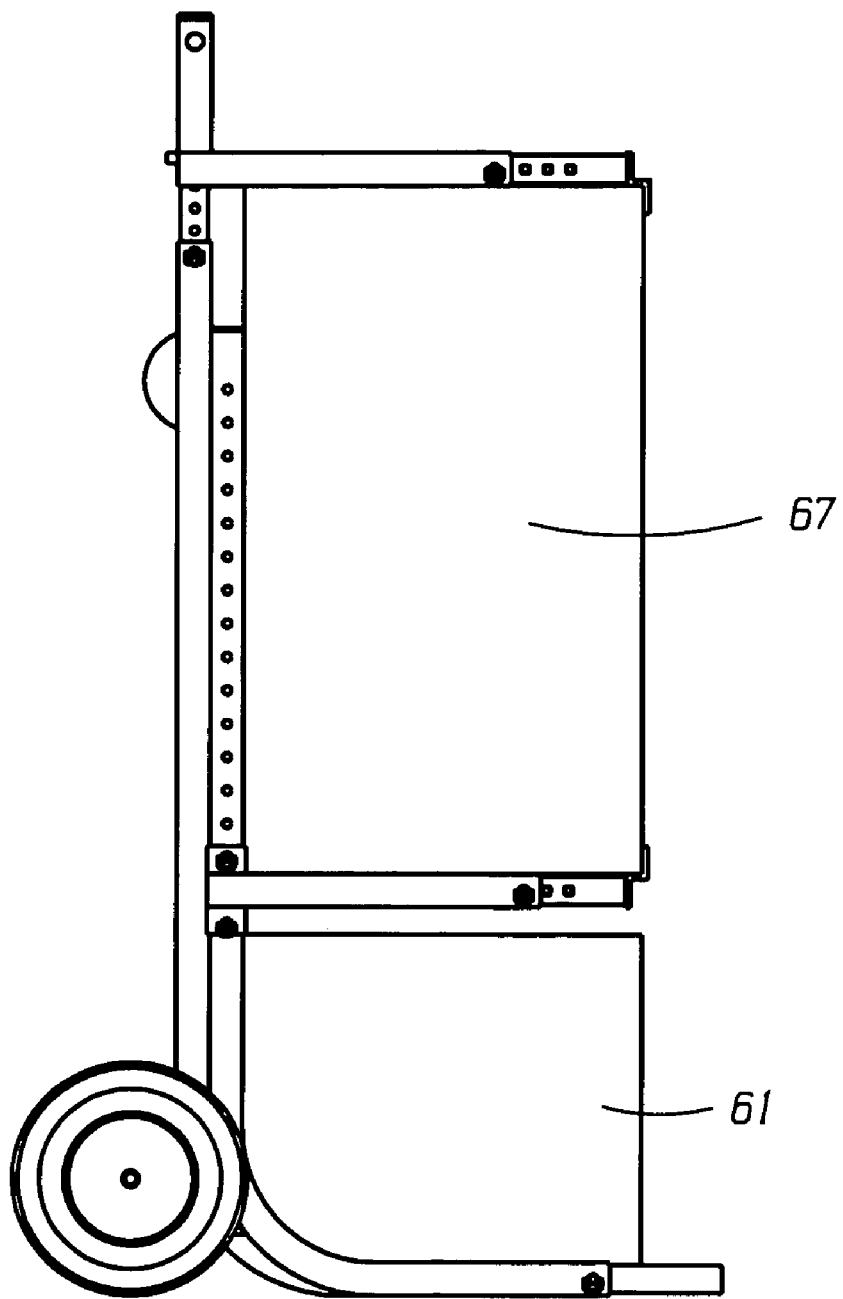
FIG. 15a shows one possible arrangement of cargo on a device according to the invention.
Figure 15B:
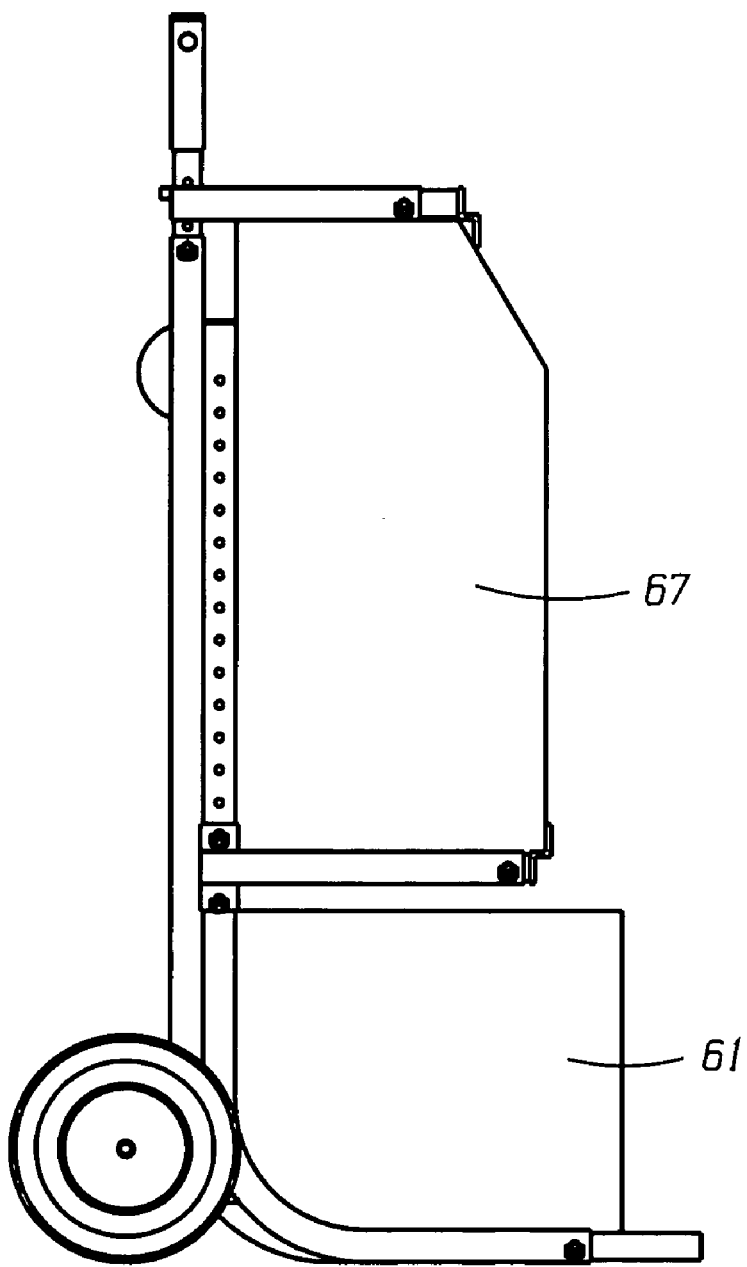
FIG. 15b shows one possible arrangement of cargo on a device according to the invention.
Figure 15C:
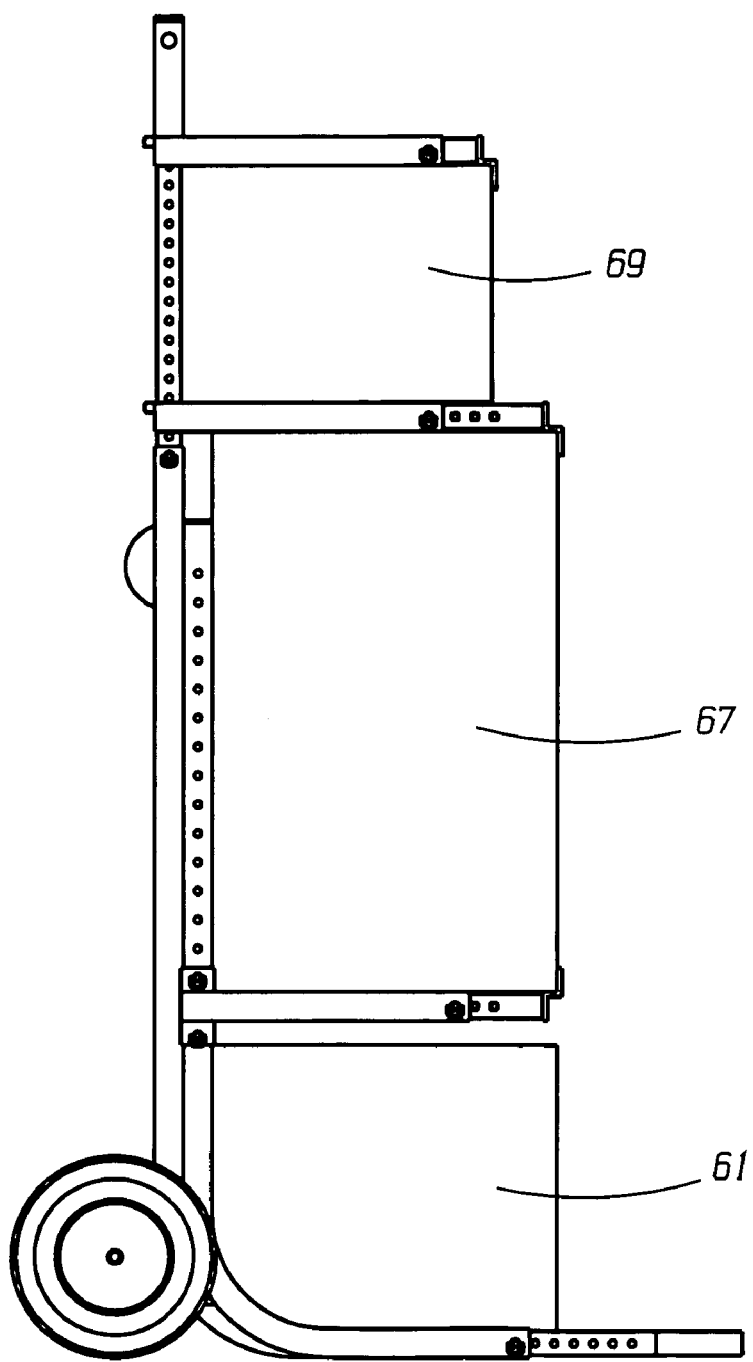
FIG. 15c shows one possible arrangement of cargo on a device according to the invention.

In FIGS. 15a, 15b, and 15c are shown different possible arrangements of cargo items such as 67 and 69 on a device according to the invention.

Although certain embodiments of the invention have been described above, the concepts of the present invention are applicable to a wide variety of wheeled hand truck devices, which in one embodiment may be considered as comprising: a) a horizontal portion onto which a cargo may be disposed; b) a vertical portion comprising a plurality of linear structural elements; c) a plurality of support arms attached to one or more of said linear structural elements, wherein the support arms are disposed substantially horizontally and each have an outer end portion having a tip portion disposed thereon which are adapted to contact a cargo item disposed on the hand truck in a grasping fashion; and d) a means for varying the length of said support arms. Thus, most, if not all hand trucks of the prior art may be fitted with one or more of the support arms as herein described to arrive at a construction embraced by the present invention. Such support arms in one preferred embodiment include an outer tubular portion and an inner portion which is slidably disposed within the outer tubular portion. Such an arrangement permits stacking of cargo on top of the support arm by virtue of the cargo resting on the outer tubular portion, while the inner portion is moveable and useful for grasping the cargo.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. The present invention further includes all possible combinations of the features recited in any one of the various claims appended hereto with the features recited in any one or more of each of the remaining claims. Accordingly, the presently disclosed invention is intended to cover all such modifications, alterations, and combinations.

I claim:

1. A device useful for transporting and securing various articles which comprises:
   a) a first outer frame member having a first end portion, a second end portion, a lower length portion and an upper length portion;
   b) a second outer frame member having a first end portion, a second end portion, a lower length portion and an upper length portion,
   wherein each of said first and second outer frame members comprise a bend, so that their lower length portions reside in the same substantially-horizontal plane and so that their upper length portions reside in the same substantially-vertical plane,
   c) a first supporting cross-member having a first end portion and a second end portion wherein said first end portion of said first supporting cross-member is attached to said first outer frame member at a point on its upper length portion, and wherein said second end portion of said first supporting cross-member is attached to said second outer frame member at a point on its upper length portion;
   d) a second supporting cross-member having a first end portion and a second end portion wherein said first end portion of said second supporting cross-member is attached to said first outer frame member at a point on its lower length portion, and wherein said second end portion of said second supporting cross-member is attached to said second outer frame member at a point on its lower length portion;
   e) a third supporting cross-member having a first end portion and a second end portion wherein said first end portion of said third supporting cross-member is attached to said first outer frame member at its first end portion, and wherein said second end portion of said third supporting cross-member is attached to said second outer frame member at its first end portion;
   f) a first inner frame member having a first end portion, a second end portion, a lower length portion and an upper length portion;
   g) a second inner frame member having a first end portion, a second end portion, a lower length portion and an upper length portion;
   wherein each of said first and second inner frame members comprise a bend, so that their lower length portions reside in the same substantially-horizontal plane and so that their upper length portions reside in the same substantially-vertical plane, said first and second inner frame members being attached to said third supporting cross member at a point on their upper length portions,
   h) a first vertical support member slidably disposed within said first end portion of said first inner frame member;
   i) a second vertical support member slidably disposed within said first end portion of said second inner frame member;
   j) a first support arm attached to said upper length portion of said first outer frame member;
   k) a second support arm attached to said upper length portion of said second outer frame member;
   l) a plurality of wheels attached at a location selected from the group consisting of: said first inner frame member, second inner frame member, said first outer frame member, and said second outer frame member.

2. A device according to claim 1 further comprising: m) a connective brace having a first end portion and a second end portion, wherein said first end portion of said connective brace is attached to said first vertical support member, and wherein said second end portion of said connective brace is attached to said second vertical support member.

3. A device according to claim 1 further comprising: m) a swingable handle means pivotally attached to said third supporting cross member.

4. A device according to claim 3 further comprising: n) a u-shaped insert having a first end portion and a second end portion, which end portions of said insert are slidingly disposed within said second end portions of said first and said second outer frame members.

5. A device according to claim 1 further comprising: m) a u-shaped insert having a first end portion and a second end portion, which end portions of said insert are slidingly disposed within said second end portions of said first and said second outer frame members.

6. A device according to claim 1 wherein said wheels are disposed at the ends of a common axle.

7. A device according to claim 1 wherein said substantially-horizontal and said substantially-vertical planes intersect to form an angle which is about 90 degrees.

8. A device according to claim 1 wherein the length of at least one of said first and said second support arms is adjustable.

9. A device according to claim 1 further comprising: m) a third support arm attached to said upper length portion of said first outer frame member.

10. A device according to claim 9 further comprising: n) a fourth support arm attached to said upper length portion of said second outer frame member.

11. A device according to claim 10 wherein the length of at least one of said third and said fourth support arms is adjustable.

12. A device according to claim 10 further comprising: o) a fifth support arm attached to said first vertical support member.

13. A device according to claim 12 further comprising: p) a sixth support arm attached to said second vertical support member.

14. A device according to claim 12 wherein the length of at least one of said fifth and said sixth support arms is adjustable.

15. A device according to claim 1 further comprising: m) a u-shaped shroud support having a first end portion and a second end portion, wherein said first end portion of said u-shaped shroud support is attached to said first outer frame member at a point on the upper length portion of said first outer frame member, and wherein said second end portion of said u-shaped shroud support is attached to said second outer frame member at a point on the upper length portion of said second outer frame member.

16. A device according to claim 15 further comprising a shroud affixed to said shroud support.

17. A device useful for transporting articles comprising:
   a) a first outer frame member having a first end portion, a second end portion, a lower length portion and an upper length portion;
   b) a second outer frame member having a first end portion, a second end portion, a lower length portion and an upper length portion,
   wherein each of said first and second outer frame members comprise a bend, so that their lower length portions reside in the same substantially-horizontal plane and so that their upper length portions reside in the same substantially-vertical plane,
   c) a first supporting cross-member having a first end portion and a second end portion wherein said first end portion of said first supporting cross-member is attached to said first outer frame member at a point on its upper length portion, and wherein said second end portion of said first supporting cross-member is attached to said second outer frame member at a point on its upper length portion;

d) a second supporting cross-member having a first end portion and a second end portion wherein said first end portion of said second supporting cross-member is attached to said first outer frame member at a point on its lower length portion, and wherein said second end portion of said second supporting cross-member is attached to said second outer frame member at a point on its lower length portion;

e) a third supporting cross-member having a first end portion and a second end portion wherein said first end portion of said third supporting cross-member is attached to said first outer frame member at its first end portion, and wherein said second end portion of said third supporting cross-member is attached to said second outer frame member at its first end portion;

f) a first inner frame member having a first end portion, a second end portion, a lower length portion and an upper length portion;

g) a second inner frame member having a first end portion, a second end portion, a lower length portion and an upper length portion;

wherein each of said first and second inner frame members comprise a bend, so that their lower length portions reside in the same substantially-horizontal plane and so that their upper length portions reside in the same substantially-vertical plane, said first and second inner frame members being attached to said third supporting cross member at a point on their upper length portions, h) a first vertical support member slidably disposed within said first end portion of said first inner frame member;

i) a second vertical support member slidably disposed within said first end portion of said second inner frame member;

j) a first support arm attached to said upper length portion of said first outer frame member;

k) a second support arm attached to said upper length portion of said second outer frame member;

l) a plurality of wheels attached at a location selected from the group consisting of: said first inner frame member, second inner frame member, said first outer frame member, and said second outer frame member;

m) a connective brace having a first end portion and a second end portion, wherein said first end portion of said connective brace is attached to said first vertical support member, and wherein said second end portion of said connective brace is attached to said second vertical support member;

n) a swingable handle means pivotally attached to said third supporting cross member;

o) a u-shaped insert having a first end portion and a second end portion, which end portions of said insert are slidingly disposed within said second end portions of said first and said second outer frame members;

p) a third support arm attached to said upper length portion of said first outer frame member;

q) a fourth support arm attached to said upper length portion of said second outer frame member;

r) a fifth support arm attached to said first vertical support member;

s) a sixth support arm attached to said second vertical support member;

wherein the length of at least one of said first, second, third, fourth, fifth, and said sixth support arms is adjustable.

18. A device according to claim 17 further comprising: t) a u-shaped shroud support having a first end portion and a second end portion, wherein said first end portion of said u-shaped shroud support is attached to said first outer frame member at a point on the upper length portion of said first outer frame member, and wherein said second end portion of said u-shaped shroud support is attached to said second outer frame member at a point on the upper length portion of said second outer frame member.

19. A device according to claim 18 further comprising a shroud affixed to said shroud support.

* * * * *